United States Patent [19]

Eagen et al.

[11] Patent Number: 5,129,056
[45] Date of Patent: Jul. 7, 1992

[54] METHOD FOR CURSOR CONTROL OF SCROLLING MOVEMENTS ON CERTAIN COMPUTER WORKSTATIONS

[75] Inventors: Stephen T. Eagen; Harvey G. Kiel, both of Rochester, Minn.

[73] Assignee: International Business Machines Corporation, Armonk, N.Y.

[21] Appl. No.: 466,152

[22] Filed: Jan. 17, 1990

[51] Int. Cl.$^5$ .............................................. G06F 3/14
[52] U.S. Cl. ...................................... 395/161; 395/155; 364/919.5; 340/706; 340/726
[58] Field of Search ................ 364/518, 521, 522; 340/825.5, 706, 726, 724; 395/155, 161

[56] References Cited

U.S. PATENT DOCUMENTS

| | | | |
|---|---|---|---|
| 4,689,616 | 8/1987 | Goude et al. | 340/725 |
| 4,727,363 | 2/1988 | Ishii | 340/724 |
| 4,803,478 | 2/1989 | Olsen | 340/726 |
| 4,873,623 | 10/1989 | Lane et al. | 364/188 |
| 4,985,848 | 1/1991 | Tfeiffer et al. | 364/518 |

Primary Examiner—Gary V. Harkcom
Assistant Examiner—Phu K. Nguyen
Attorney, Agent, or Firm—Palmatier & Sjoquist

[57] ABSTRACT

A process for controlling cursor-scrollable display information for a plurality of dependent workstations from a single workstation controller, including the steps of prestoring format tables and scrollable panel areas for each dependent workstation in the workstation controller, processing cursor movement keystroke signals within the workstation controller to cause scrolling to occur for any dependent workstation when a cursor movement keystroke is made in that workstation when the cursor is displayed at a beginning or an end position of a scrollable area.

5 Claims, 6 Drawing Sheets

```
                    DIRECTORY OF FILES
Type desired options, press Enter
  Options: 1=Browse  2=Edit  3=Delete
                                              : Item: 1 to 13 of 93

OPT   FILENAME   FILETYPE    FM   RECFM   LRECL   LEVEL
 X    ABIOREQS   LISTING     BI    V        71    3/06/89
 _    CUA_SFVD   LISTING     BI    V        72    10/05/88
 _    CUA_DEMO   LISTING     BI    V        73    2/21/89
 _    CUAMISC    LISTING     BI    V        73    11/17/88
 _    SCUADS     LIST3800    BI    V       100    2/01/89
 _    CFCSF      SCRIPT      BI    V        96    2/07/89
 _    CFFCEF     SCRIPT      BI    V        66    2/24/89
 _    CGLOSS     SCRIPT      BI    V        72    10/11/88
 _    CHIFAB     SCRIPT      BI    V        76    2/01/89
 _    CHIFCA     SCRIPT      BI    V        72    3/07/89
 _    CHIFEF     SCRIPT      BI    V        89    2/23/89
 _    CHIFFKA    SCRIPT      BI    V        72    3/07/89
 _    CHIFGEH    SCRIPT      BI    V        72    2/24/89

F3=Exit   F7=Up   F8=Down
```

*Fig. 6A*

```
                    DIRECTORY OF FILES
Type desired options, press Enter
  Options: 1=Browse  2=Edit  3=Delete
                                              : Item: 2 to 14 of 93

OPT   FILENAME   FILETYPE    FM   RECFM   LRECL   LEVEL
 _    CUA_SFVO   LISTING     BI    V        72    10/05/88
 _    CUA_DEMO   LISTING     BI    V        73    2/21/89
 _    CUAMISC    LISTING     BI    V        73    11/17/88
 _    SCUADS     LIST3800    BI    V       100    2/01/89
 _    CFCSF      SCRIPT      BI    V        96    2/07/89
 _    CFFCEF     SCRIPT      BI    V        66    2/24/89
 _    CGLOSS     SCRIPT      BI    V        72    10/11/88
 _    CHIFAB     SCRIPT      BI    V        76    2/01/89
 _    CHIFCA     SCRIPT      BI    V        72    3/07/89
 _    CHIFEF     SCRIPT      BI    V        89    2/23/89
 _    CHIFFKA    SCRIPT      BI    V        72    3/07/89
 _    CHIFGEN    SCRIPT      BI    V        72    2/24/89
 X    CHIFSF     SCRIPT      BI    V        73    3/02/89

F3=Exit   F7=Up   F8=Down
```

*Fig. 6B*

METHOD FOR CURSOR CONTROL OF SCROLLING MOVEMENTS ON CERTAIN COMPUTER WORKSTATIONS

BACKGROUND OF THE INVENTION

The present invention relates generally to computer workstations which are connected for information interchange with host or mainframe computer systems; more particularly, the invention relates to a method for controlling scrolling of display panel areas by the use of cursor movement keys on certain computer workstations in order to provide a consistent user interaction between workstation types.

Historically, operator interface with a mainframe computer system evolved from a single operator control console which was attached to the mainframe structure. The operator control console amounted to little more than a keyboard for enabling the operator generation of simple input commands, and a display screen for enabling the mainframe computer to present simple status messages to the operator. The evolution and expansion of this concept lead to the development of multiple, limited-intelligence terminals, to enable a number of users to communicate with a mainframe system, wherein the multiple terminals were perhaps remotely positioned from one another, and from the mainframe system, but commonly connected to a controller, and the controller was connected to the mainframe computer system. However, the multiple terminal concept was a relatively low cost solution to enable multiple users to communicate with a mainframe computer system, but with limited intelligence contained within each terminal, so that the user communication was restricted to relatively simple input/output transfers.

The development of the stand-alone personal computer (PC) provided a high level of internal intelligence to enable a great many user interface functions to be added to the PC, with the result that the PC became a very "user friendly" device. Among the interface enhancements which were made possible by the PC development were enhanced cursor controls, the creation of selection cursors, and instantaneous cursor scrolling on the display screen.

The user friendly PC soon became adapted for communication with computer systems, initially by connecting the PC to a workstation controller, and by writing software to enable the PC to emulate a terminal with limited intelligence, normally connectable to the controller. Eventually the PC/system interface was developed to enable a PC to communicate more or less directly with a host computer, wherein the independent intelligence contained within a PC could be used both to enhance the user interface with the host computer system and to independently execute software apart from the host system. A class of terminals evolved utilizing these concepts, which became known as "intelligent" terminals, and the previously evolved, limited-intelligence terminals became known as "dumb" terminals. By virtue of the widely varying internal intelligence of these two types of terminals, the capabilities and rules for using the terminals also became widely varied.

A great deal of effort has been spent in attempting to develop a set of rules for common usage of computer workstations, even though the hardware designs of such workstations may be widely varied. The basis for this effort is to simplify the rules for users of these workstations, thereby reducing the amount of time required by a user in understanding the interaction with the workstation. Further, to the extent that the rules for using different types of workstations can be made "universal," a common programming interface to control presentation management functions can be developed. If a common programming interface can be developed, and it is made independent of the particular workstation device or type, programming time and effort is saved, because it is not necessary to prepare different versions of the same program interface for different workstation types. In an idealized situation, the rules for user access and interaction would be identical for all workstations, regardless of the level of hardware design sophistication of any particular workstation. However, the idealized situation is difficult to achieve, because of the differences in hardware design sophistication between and among workstations. The so-called "intelligent" class of workstation inherently includes a hardware design which is capable of a full range of independent computer operations; the so-called "dumb" workstation typically includes only enough hardware design to enable operator interaction through a keyboard and display screen for communicating simple information and commands. For example, International Business Machines (IBM) has classified the universe of "intelligent" workstations under the heading of "programmable workstations" (PWS); the second category has been classified under the designation of "non-programmable" or "dependent workstations" (DWS). The IWS is inherently capable of performing a relatively high level of independent computer operations, whereas the DWS is essentially capable of merely receiving command and control information from a host computer, displaying it, and transferring operator keystroke data back to the host computer via a controller. Naturally, the cost of a PWS is significantly higher than a DWS, although for a great number of computer applications the limited sophistication of a DWS is adequate for the task at hand. It is not unusual for a computer purchaser to initially utilize one or more DWS devices connected to a host computer, and then later upgrade these devices to PWS devices. It is also not unusual to have both DWS and PWS devices connected to the same host computer system.

A PWS is typically a complete computer processing system, and may have a built-in media device such as a diskette or hard disk. A PWS can therefore run stand-alone processing applications in the workstation, and can communicate independently with a host computer system through standard communications connections. In contrast, a DWS is connected to a host system through a workstation controller (WSC), and in a typical system arrangement a single WSC is connected to and supports a considerable number of DWS devices. The WSC communicates with the host processor through local bus or remote communications connections, and each DWS is attached to the WSC via a communications cable. The DWS can operate only on host-based computer processing applications, and has only a limited internal capability to provide enhanced user interface functions. Whereas a PWS typically has 1-16 or more megabytes of internal memory, the DWS internal memory is minimal. The PWS can always store at least the data required for assembling or constructing one or more screen display images in its internal memory, whereas the DWS can only store the data to refresh the screen image currently being displayed, and therefore each time the display screen is changed in a DWS the change must be initiated by the host processor.

In any typical system utilizing a host processor and workstations, wherein the workstations are utilized for user interaction and access, the host processor provides certain fundamental information. For example, the host processor may generate a data stream containing information to be displayed on a workstation screen, and further information for controlling the presentation of the data on the screen. Certain screen attributes may be dictated by the host processor, and the work station controller may initially position the cursor and change the cursor presentation, i.e., to a blinking or no blinking mode, or to or from a reverse image display, and it may move the screen display data. The workstation controller may poll the workstation to determine whether a keystroke should be recognized or whether any of a predetermined number of commands have been accepted. In the case of a PWS, the host processor data stream is sent directly to the workstation and is processed internally in the workstation, which itself contains sufficient internal memory and program data to directly control the interaction with the display screen and keyboard. In the case of the DWS, the host processor data stream is sent to a workstation controller (WSC), and the WSC provides the internal memory and control for directly controlling the display screen of the DWS. This results in a more limited set of options available to the user of a DWS, than is available to the user of a PWS.

It would be a distinct advantage to the users if the DWS and PWS terminals could be operated under the same set of user interaction rules, and manufacturers strive continuously for this result. For example, IBM has defined a "common user access" (CUA) for use with IBM's Systems Application Architecture (SAA), which has been published in IBM Publication No. SC26-4351-0 under the title "Common User Access Panel Design and User Interaction." This publication sets forth a set of common user access specifications to attempt to achieve consistency among the various types of workstation designs. However, the specification distinguishes, in a number of important respects, the rules for user access to PWS terminals versus DWS terminals. It would be an advantage if the number of instances of differences between such terminals could be reduced or even eliminated, to enable users to have the same understanding regarding access to a terminal, regardless of its degree of design sophistication. The foregoing CUA publication distinguishes PWS terminals as "programmable workstations" and DWS terminals as "nonprogrammable terminals." A nonprogrammable terminal is defined as a terminal attached to a host processor via a workstation controller, in which all or most of the user interface functions are controlled by the host.

The user interaction with a terminal, and therefore with the host computer, is accomplished via a user-operated keyboard and a display screen. In a PWS the user interacts with the display screen by means of a selection cursor, which highlights a selection field choice displayed on the screen to provide a focal point for user interaction with the screen, or by means of a text cursor, which indicates a character position within an entry field on the screen. In a PWS the selection cursor appears on the screen as a form of emphasis or highlighting, such as reverse color, and the selection cursor may highlight a selection field choice or an entry field. In a prior art DWS terminal there is no fully comparable selection cursor, and the text cursor is used to perform a more limited function. The text cursor is a marker which may be movably positioned to character positions on the screen, to point to character choices or for entering information from the keyboard at the desired location.

Under the rules defined for CUA, display panels can contain several types of scrollable panel areas, including scrollable selection fields, scrollable data areas, scrollable list areas, and scrollable information areas. The CUA rules define several ways to scroll these panel areas; cursor-independent scrolling is performed by the host computer in response to a user pressing a function key while the cursor is within the scrollable panel area; cursor-dependent scrolling has heretofore been performed only on a PWS device in response to the user pressing one of the cursor movement keys at the top or bottom borders of the scrollable areas. It would be an advantage to allow DWS users to perform cursor-sensitive scrolling in the same way that PWS users can presently perform this scrolling, both to improve user productivity and to eliminate some of the special case differences which must be presently accounted for as between these two different types of devices. User productivity is increased by allowing the user to perform both tasks, cursor selection and scrolling, with the cursor movement keys, and productivity is also increased by the improvement in response time when these keys are used. Cursor-sensitive scrolling causes one line to be scrolled at a time within the scrollable area; this provides the user with total control over the positioning of the scrollable area contents. Cursor-independent scrolling usually causes the area to scroll a fixed increment of lines, which may not allow the user to position a particular choice at the top of a list area.

It is apparent that a more sophisticated set of rules and definitions may be utilized for scrolling on a PWS, because the PWS internal design provides for sufficient memory and control to regulate these functions; the lack of such sophisticated memory and control in a DWS requires that the scrolling function be limited to cursor-independent scrolling controlled by the host processor. Therefore, a user operating a PWS will interact with the system differently than a user operating a DWS, and the user having access to both types of devices must be aware of the different sets of rules for such interaction. It would be an advantage if such rules could be consistently defined and applied, to enable the user to utilize the cursor-sensitive scrolling rules defined under CUA for a PWS, even in situations where the user was interacting with a DWS.

SUMMARY OF THE INVENTION

The present invention provides a method for enabling a user to implement cursor-sensitive scrolling according to the CUA rules set forth for a PWS, when the user is operating a DWS. The invention adopts the rules for CUA scrolling, wherein certain keyboard cursor movement keys cause predefined panel area scrolling, and applies them to DWS devices. The increased memory and control which is required for the higher level of scrolling sophistication is accomplished by DWS interaction with a workstation controller (WSC), and by utilizing the more sophisticated design capabilities of the WSC for controlling the screen display at a DWS.

Certain DWS cursor movement keystrokes are transferred as commands to a WSC, resulting in a WSC-initiated sub-program to assemble a subset of screen commands, which are then transmitted to the DWS for controlling actual screen displays. The user may initiate such DWS keystrokes, according to the CUA rules for operating a PWS, and the user therefore obtains a PWS-type interaction with the screen, which interaction is actually developed by sub-routines within the WSC and transmitted to the DWS via its normal connection protocol.

It is the principal object of the present invention to provide a uniform user interface capability for cursor-sensitive scrolling movement which is the same for DWS devices as it is for PWS devices.

It is a further object of the present invention to upgrade the apparent sophistication of a DWS, to enable it to comply with the PWS rules for common user access, and to provide a consistent programming interface that is independent of device type.

BRIEF DESCRIPTION OF THE DRAWINGS

The foregoing and other objects and advantages of the invention will become apparent from the following specification, and with reference to the claims and the appended drawings, in which:

FIGS. 6A and 6B show representative display panels to illustrate cursor-sensitive scrolling.

DESCRIPTION OF THE PREFERRED EMBODIMENT

Independent Workstation

Figure 1:
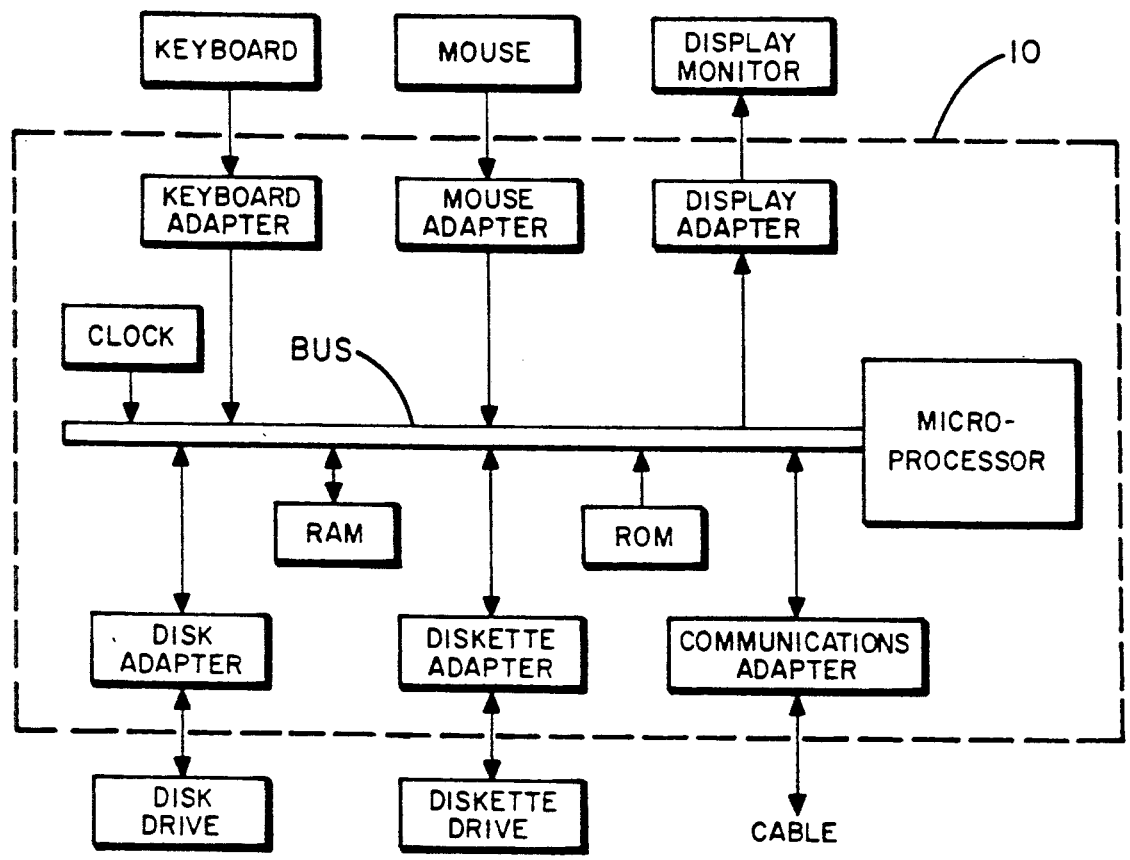
FIG. 1 shows a typical block diagram of a PWS.

Referring first to FIG. 1, there is shown a typical block diagram of a PWS; the circuits within the dotted outline 10 are generally found on one or more circuit boards within the PWS. The microprocessor is typically an Intel type 80286 or 80386, or equivalent microprocessors by other manufacturers. The microprocessor has an external bus which may communicate with a number of adapters which themselves are connectable to various internal and external devices. The typical PWS will have a keyboard and/or mouse connected through an adapter to the internal bus, a display monitor connected through an adapter to the internal bus, one or more disk or diskette adapters coupled to one or more disk or diskette drives and connected to the internal bus, and a communications adapter which is connectable to other systems via external cables. The RAM is typically a random access memory having 1-16 megabyte capacity, which is sufficiently large to store a complete operating system, an extensive work area for programmable calculations, a monitor screen buffer area and an area for executing application programs. The ROM is a read only memory which typically contains coding for powering on the machine, for performing diagnostic operations, and for controlling the basic I/O system; the ROM is typically 64-128 kilobytes in capacity. The PWS is therefore operable as a stand-alone computer system, or as an independent workstation which may be connected to a host computer via external cables. The capabilities of the PWS enable it to provide a wide variety of user enhancements, including a full range of cursor controls, instantaneous scrolling, and display screen modification. All of these enhancements are contained and controlled within the PWS itself, although when a PWS is connected to a host computer processor and is operated as a workstation, it receives its overall command and control from the host processor. For example, the host processor may transmit data representative of display screen content to the PWS, and may identify the formats by which the data is to be displayed and controlled, but once the PWS receives the broad directions from the host processor the PWS itself generates the internal control signals for regulating the actual data display on the display monitor.

The intelligence of the hardware built into the PWS enables it to run applications programs independently of the host computer. In a typical system operation, the host computer may direct a PWS to perform certain subroutines or lower level applications programs, and thereafter to present the results of these programs to the host processor. In this environment, the PWS is fully capable of cursor-sensitive scrolling, because the PWS itself contains all of the relevant memory relating to the panel constructs, the lists of information which may appear in the various panel areas, and the current image displayed on the panels. Therefore, the PWS performs cursor-sensitive scrolling entirely on the basis of its own intelligence and its own internal memory, without need to reference the host processor. In this context, the PWS performs exactly as a stand-alone PC. Cursor-sensitive scrolling appears as an instantaneous response to a user cursor movement keystroke, because the internal processing is entirely performed within the PWS.

Dependent Workstation

Figure 2:
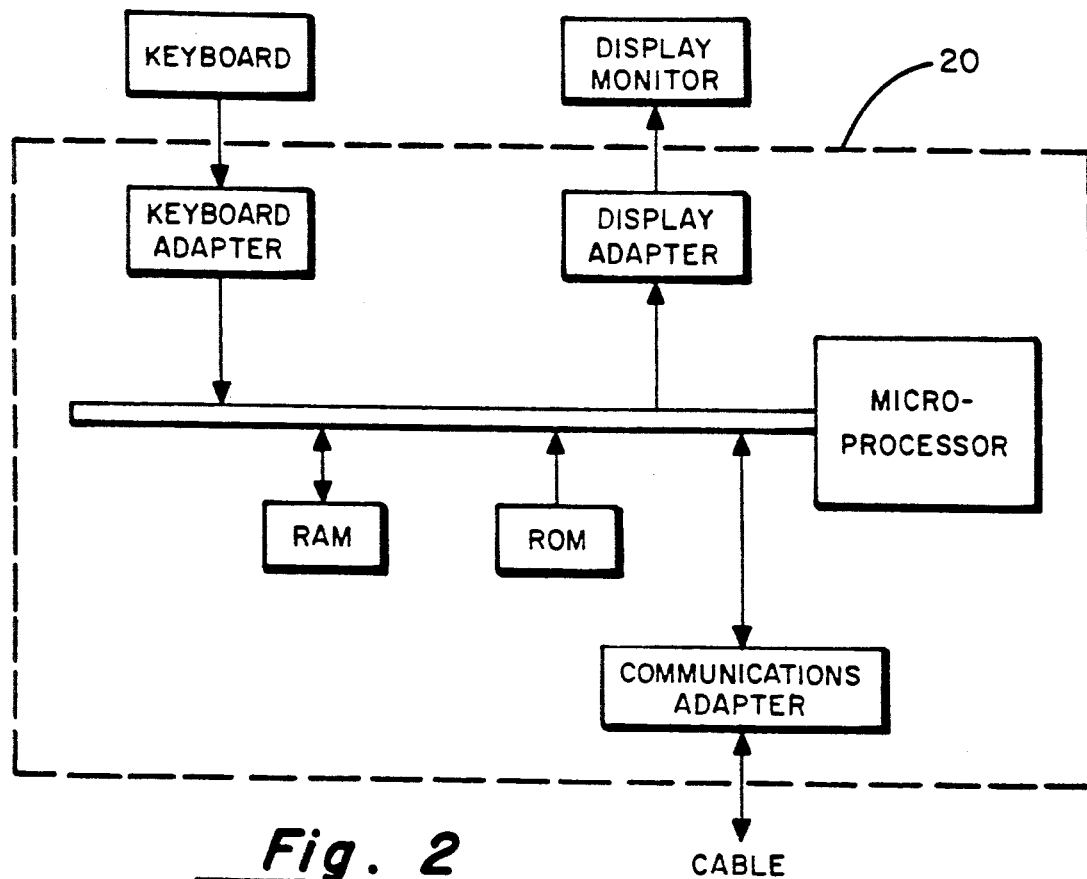
FIG. 2 shows a typical block diagram of a DWS.

FIG. 2 shows a typical block diagram of a DWS, wherein the circuits typically found within the cabinet are designated within dotted outline 20. The microprocessor is typically an Intel type 8088 or 8086 circuit device, or equivalent, and the microprocessor has an external bus which is connectable to several adapters for enabling communications with a limited number of external devices. For example, a keyboard adapter enables communications between the microprocessor and a keyboard, a display adapter enables information to be transferred to a display monitor, and a "communications" adapter enables communications to be made between the DWS and a host controller. The RAM is typically capable of 3-5 kilobytes of storage, for storing a screen buffer, and for providing a limited amount of memory work area for internal processing. The ROM is typically about 8 kilobytes in capacity, for storing coding relating to power-on processing, diagnostics, character generation patterns and process communication protocols for communicating with other systems. The DWS is incapable of any significant internal processing beyond that which is required to interface with the keyboard and display monitor, and to communicate via the communications adapter. Therefore, all of the information displayed on the display monitor must be provided via the communications adapter to the RAM, and the microprocessor will generate sufficient internal control to display the information on the display monitor. Similarly, all keystrokes from the keyboard are temporarily received in the RAM, subject to activation of the communications adapter for transmission of the keystroke information over the cable to the WSC.

The limited intelligence of the DWS entirely prevents any effective use of cursor-sensitive scrolling within the device itself. The DWS contains only sufficient memory to retain the screen image currently being displayed, and therefore any change in that screen image requires the DWS to request assistance from the host processor via the WSC. In effect, the host processor would in this situation be required to monitor every keystroke of the DWS, to detect keystrokes which are cursor-sensitive key strokes, and then to perform the internal processing for realigning the screen image to effectuate the scrolling. Thereafter, the host processor would have to transmit the modified screen image to the WSC, and thence to the DWS as a new screen image to be displayed. In a typical system where many DWS devices may be connected via one or more WSC's to a host processor, the host processor is required to serve as a keystroke processor for each and every key stroke of each and every DWS in the system, thereby placing an extreme burden on the processing capabilities of the host. To a user in this situation, cursor-sensitive scrolling appears as a delayed response to his keystroke, and the efficiency and operation of the entire system is severely degraded. Therefore, cursor-sensitive scrolling in a DWS device has simply not been practical in the prior art.

Workstation Controller

Figure 3:
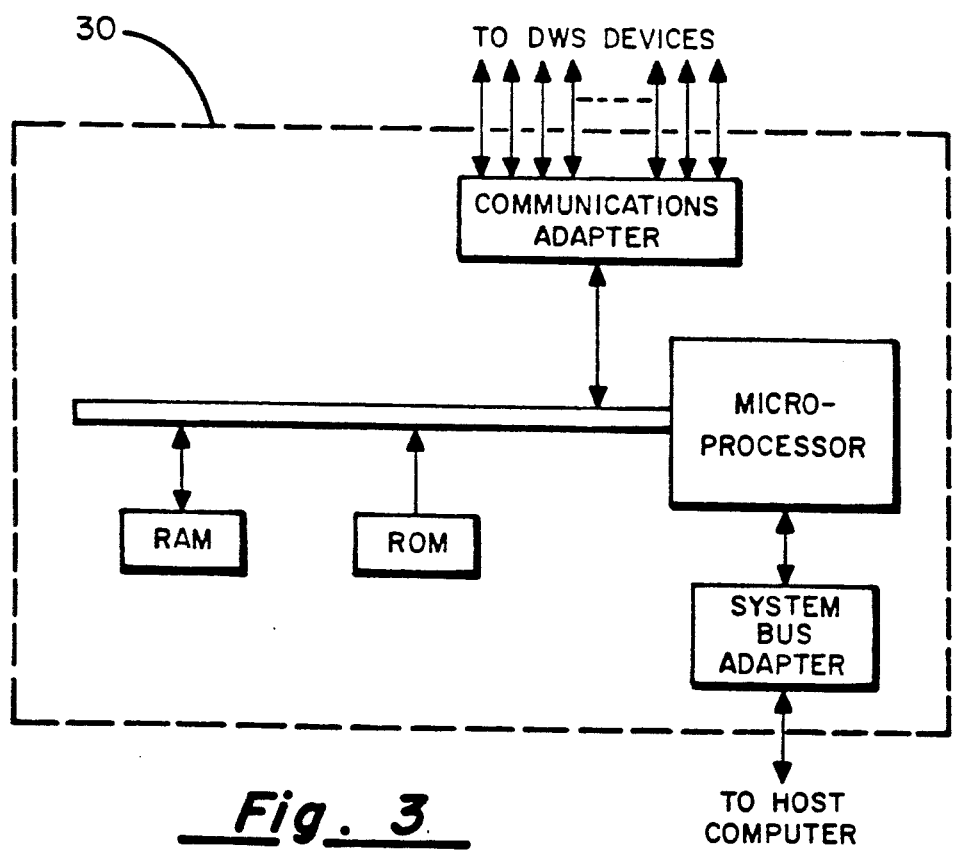
FIG. 3 shows a typical block diagram of a workstation controller.

FIG. 3 shows a typical block diagram of a workstation controller, of the type which typically communicates with a plurality of DWS devices. The workstation controller has a number of circuits contained within a package designated by dotted outline 30, and a microprocessor which is typically an Intel type 80826 circuit chip, or equivalent. The WSC microprocessor is connected to a system bus adapter which itself may communicate with a host computer processor. The WSC also has an internal data bus and a RAM having a capacity of 0.5–2.0 megabytes, and a ROM having a capacity of about 16 kilobytes, containing coding for powering on the WSC and for diagnostics relating to the WSC. The internal data bus of the WSC is connected to a communications adapter, which is externally connected to a "fan-out" box, which is in the form of a multiplexer for enabling a plurality of DWS devices to communicate with a single WSC. In a typical application, the fan-out circuits are connectable to up to 40 DWS devices, and the screen display information for each of these DWS devices is stored within the WSC RAM memory. Likewise, keystroke signals from all of the DWS devices are received by the WSC and stored within the RAM, for subsequent communication to the host processor or for internal processing by the WSC.

Figure 4:
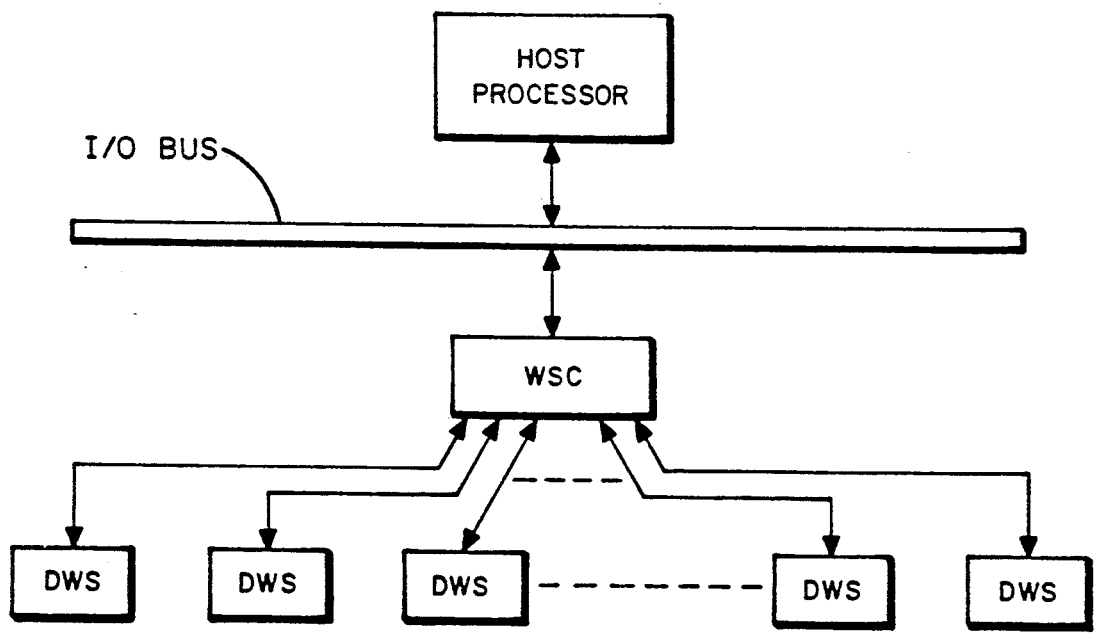
FIG. 4 shows a typical block diagram of a plurality of DWS devices connected to a host computer via a WSC.

FIG. 4 shows a typical block diagram of the system interconnections, wherein the host processor communicates with a WSC via an I/O bus and/or communications cable, and a WSC communicates with up to 40 DWS devices via communications cables. Other devices and controllers may be connected to the I/O bus for communication with the host processor.

Under typical operating conditions in the prior art, the host processor will construct a screen display for each of the DWS devices to which it is connected, the host processor will then transfer the data representative of each screen display to the WSC, where it is retained within a section of RAM identifiable with each particular WSC. The WSC then transfers the screen display data to each of the DWS devices, and each DWS device contains sufficient internal storage to retain the screen display data for purposes of presenting the display image to the user. Included in the display image data will typically be information relating to the position of the cursor, which in the case of a prior art DWS device is merely a character or text cursor. The WSC transmits this cursor information to the DWS, including the appearance and location of the cursor on the screen. If a DWS user makes a cursor movement keystroke, a signal is sent by the DWS to the WSC which indicates that the DWS has output data available for transfer to the host processor. The WSC polls the DWS to make the transfer of this keystroke signal and transmits a new text cursor position back to the DWS. The WSC retains in its internal memory and control information relating to all of the screen display images with which it is dealing, and information relating to all of the cursor position information for the various DWS devices it is interacting with. It transmits to and receives this information from the host processor upon command.

The present invention derives from the realization that the WSC contains sufficient intelligence for performing enhanced cursor-sensitive scrolling functions, and that these functions may be performed by WSC processing operations without the need for additional loading of the host processor. The WSC is capable of retaining within its own memory all of the rules and formats for regulating cursor-sensitive scrolling, and it may therefore provide these functions for a plurality of DWS devices to which it is connected, on a time-shared basis as needed. The WSC is inherently designed to detect all DWS keystrokes, and therefore the additional internal programming required to further monitor these keystrokes for detection of cursor-sensitive scrolling keystrokes is readily accomplished. Copending U.S. application Ser. No. 07/466,151 filed Jan. 17, 1990, entitled "Method for Controlling Cursor Movement on Certain Computer Workstations," describes the interaction between the DWS and WSC for producing and controlling cursor movement, which is a function enhancement of the role of a WSC in providing intelligence for DWS features.

If the IWS Common User Access (CUA) rules are to be applied to a DWS, the problem of cursor definition, position and control become greatly complicated. Under the CUA rules the screen itself becomes subdivided into separate space areas, defined as "panel areas," and the rules for cursor movement, control and scrolling vary between and within individual panel areas. For example, the concept of a "selection" cursor is introduced, to highlight certain display characters and words; in addition, the text cursor continues to be used, but only in limited areas of the screen and according to predefined rules. Therefore, when a user makes a cursor movement keystroke on the keyboard, the type and position of cursor which will appear, and whether scrolling will occur, is dependent upon the CUA conventions for the particular panels being displayed, and is also dependent upon the particular cursor keystroke movement which is made. In a PWS the added complexity of processing cursor information is readily handled within the processor capabilities inherent to the PWS. However, in a DWS device there is no comparable processor capability, and heretofore the DWS device could not be used with all of the enhancements described in the Common User Access conventions. Of course, the DWS processing capabilities could be expanded to enable it to handle the additional cursor definition and control functions, but this would defeat the very basis for utilizing DWS devices; namely, to provide a simple, low-cost terminal for user access. The perceived advantage in utilizing DWS devices as user access terminals is that their low cost permits a great many devices—up to 40—to be connected to a mainframe computer via a single WSC. Multiple WSC's may be used in a system to enable attachment of hundreds of DWS devices to the mainframe computer. Therefore any increase in the cost of a single DWS, by way of increasing its processing capabilities, is multiplied many times over when considered in the context of a larger system. The present invention solves this dilemma by placing the processing capabilities required for cursor-sensitive scrolling in the WSC, thereby utilizing the WSC processing capability on a time-shared basis with a plurality of DWS devices. Therefore, scrolling may be processed by the WSC for each of the DWS devices connected to it, each time the need for such processing arises. If increased memory or control is needed for these enhanced cursor functions, it need be placed in only a single device—the WSC—rather than a plurality of DWS devices.

The specific programming requirements for communicating between a workstation controller and a typical host computer processor, and ultimately with a DWS, is described in IBM Publication No. SA21-9247-6, entitled "IBM 5250 Information Display System--Functions Reference Manual." This information is incorporated by reference herein, as a disclosure of the required programming formats and data interchange. However, in addition to the disclosure therein, the present invention requires implementation of additional processes, which may be incorporated into the software of the WSC.

Under the CUA rules and procedures set forth in the aforementioned IBM CUA publication, several types of scrollable panel areas are defined, including scrollable selection fields, data areas, list areas, and information areas. The CUA rules define several ways to scroll these panel areas. Cursor-independent scrolling is performed in response to a user pressing a function key while the cursor is within the scrollable area. Cursor-dependent scrolling is performed by software intelligence within a PWS in response to "cursor up" and "cursor down" keystrokes. The present invention enables cursor-dependent, or cursor-sensitive scrolling to also be performed on a DWS, by WSC/DWS interaction according to the description herein. In allowing a DWS user to cause cursor movement keys to perform scrolling, the present invention enables a DWS to behave as though it were a PWS, thereby permitting the user to perform cursor-sensitive scrolling in a scrollable area without alternating between cursor movement keys and cursor-sensitive scrolling keys. User productivity is increased, and the operational differences formerly found between a PWS and a DWS are reduced.

Cursor-sensitive scrolling causes one line to be scrolled at a time within the scrollable area. To accomplish this, the WSC stores all data transmitted to it by the host processor for presentation within a scrollable panel area, and manages the presentation and scrolling of the scrollable area. An example is given by reference to FIGS. 6A and 6B, wherein typical display panels are shown. In FIG. 6A a panel shows an initial presentation of a scrollable list, wherein the textual scrolling information in the list area indicates that items 1-13 are displayed, out of a total of 93 items in the list. The "X" indicates the cursor position. If the user moves the cursor downwardly to the last position on the list displayed on FIG. 6A, and then makes another "cursor down" keystroke, the panel display changes to that shown on FIG. 6B. In FIG. 6B, the first item on the list has been scrolled upwardly out of view, and the last item on the list is a newly-displayed list item, positioned opposite the cursor. The textural scrolling indicators have been changed to refer to the items as being items 2-14, of a total of 93 times.

All of the processing required to implement the foregoing example is accomplished within the WSC, in response to the user keystroke attempting to downwardly position the cursor, when the cursor is already at the bottom line of the scrollable panel are. The WSC prestores the list data displayed as well as list data not displayed, and keeps track of the current cursor position, so that when the cursor position reaches the bottom list entry a further "cursor down" keystroke will cause the WSC to scroll the entire list upwardly and thereby to form a new panel display. A similar action will occur if a "cursor up" keystroke is made in the topmost display list entry when undisplayed cursorable items in the panel area exist above the displayed area.

Figure 5:
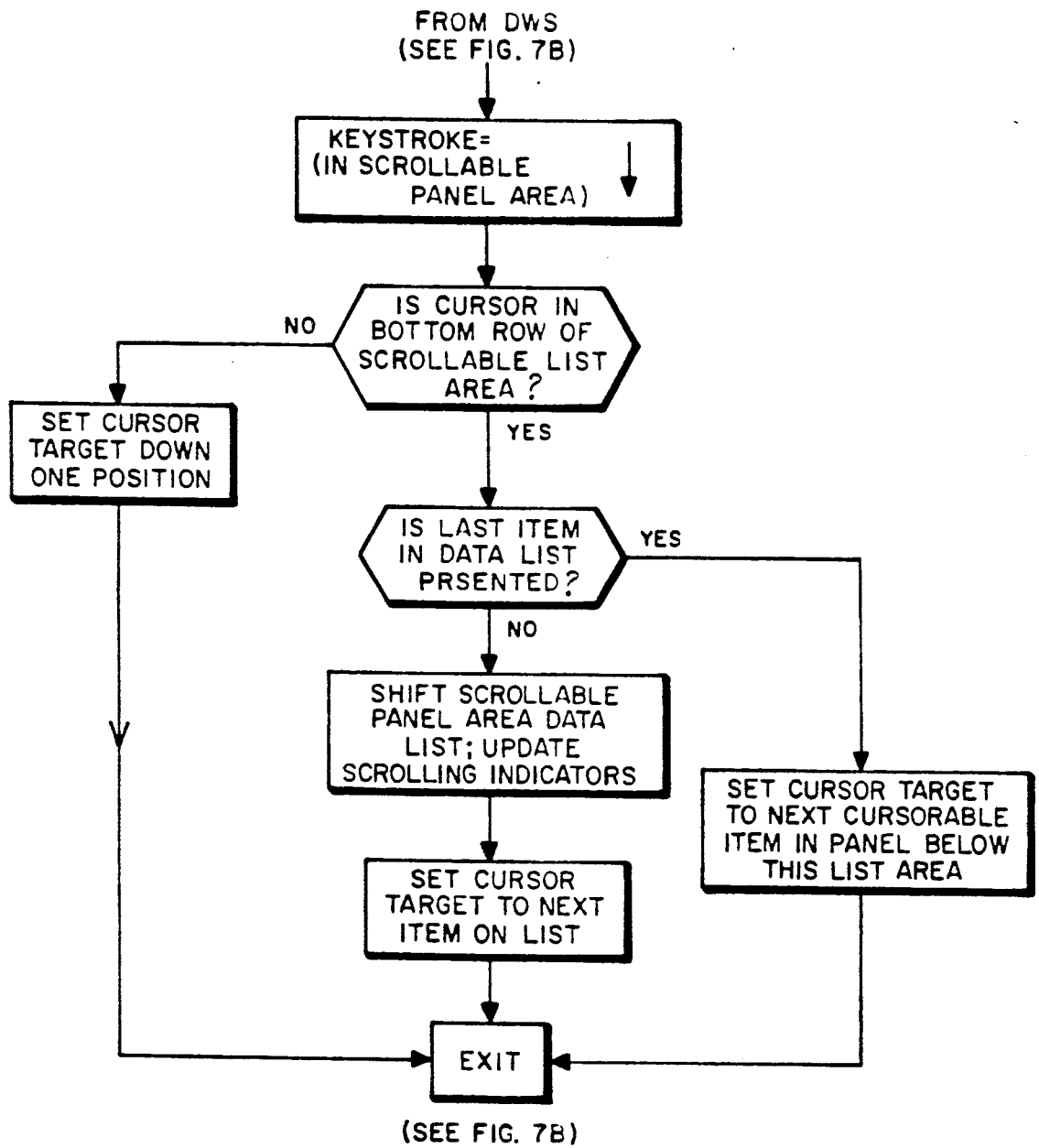
FIG. 5 is a flow chart showing cursor-sensitive scrolling in a WSC.

The flow chart of FIG. 5 illustrates the processing action which occurs within the WSC in conjunction with the foregoing example, wherein a "cursor down" keystroke signal is received by the WSC from the DWS, when the cursor is positioned within a scrollable panel area. This keystroke is recognized, and the WSC software first determines whether the cursor position is in the bottom row of the scrollable list area. If the cursor position is not in the bottom row, the cursor is simply moved downwardly to the next list item, and a new command is transmitted to the DWS to display the repositioned cursor. If the cursor is in the bottom row of the scrollable list area the WSC software determines whether the last item in the list is currently being presented on the panel. If the last item on the list is currently being presented on the panel display, the cursor is moved downwardly to the next cursorable item in the panel below the list area, and a command is sent by the WSC to the DWS to display this movement. If the last item in the list is not currently being presented, the WSC software scrolls the list items upwardly one position and sets the cursor position adjacent to the list item which was moved into the display panel area; the WSC transmits the new screen image to the DWS.

The foregoing example is representative of the processing of a "cursor down" cursor movement key within a scrollable panel area, although a "cursor up" keystroke may be processed in a manner similar to that shown in FIG. 5. The advantages over the prior art DWS operation are evident, for not only does it enable the DWS to utilize cursor-sensitive scrolling, but it also allows the user to perform both scrolling and cursor selection using the cursor movement keys instead of requiring the user to switch between the function and cursor movement keys to perform these tasks. To accomplish this purpose, the WSC stores the scrollable data for each of the DWS devices to which it is connected. For scrollable panel areas, the host processor typically transmits a large amount of data to the WSC in a single transfer operation. The WSC stores several screens of data, and therefore the number of data transmission operations between the WSC and the host processor is reduced.

Figure 7A:
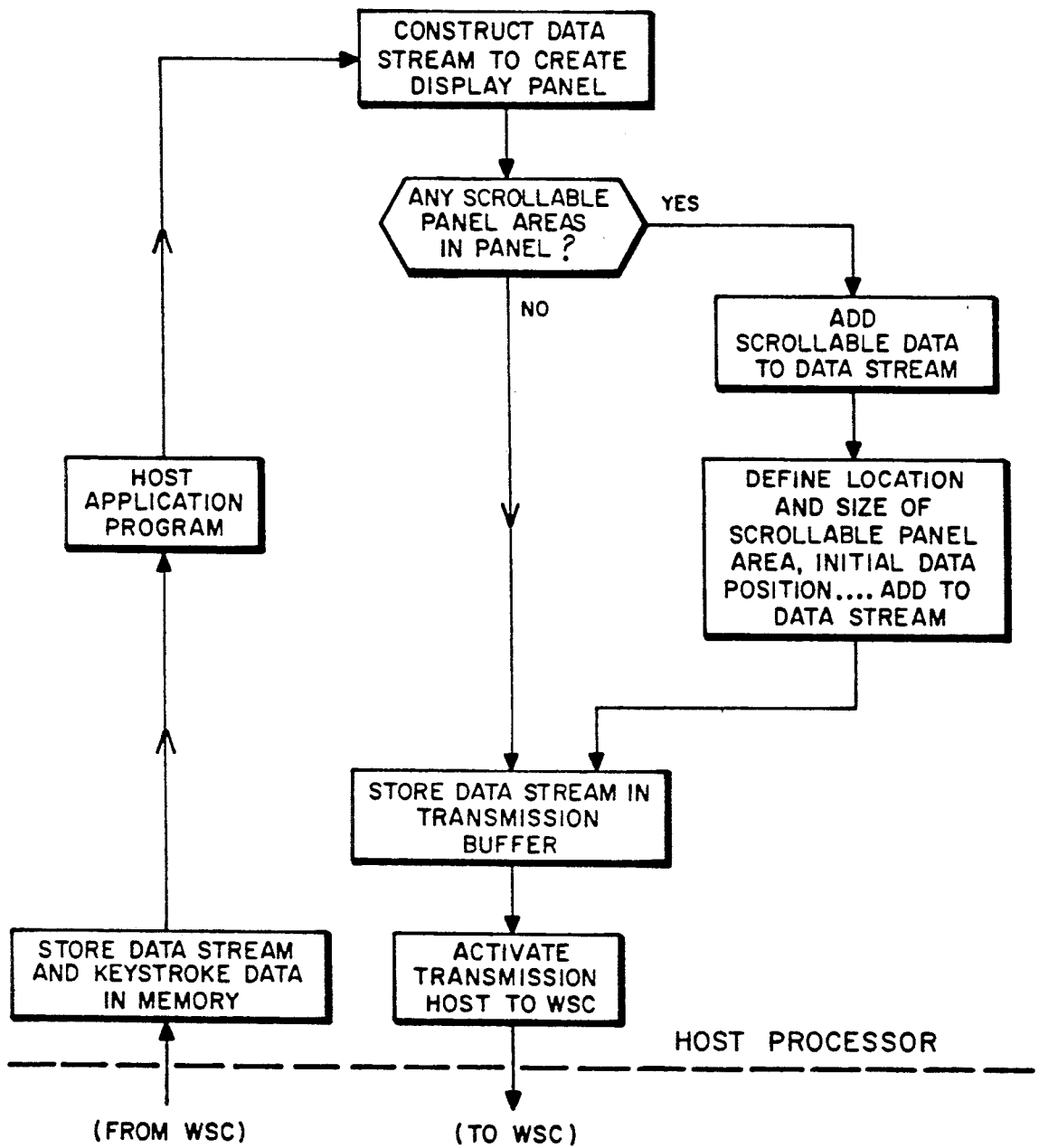
FIGS. 7A and 7B are flow charts showing the process for defining and managing scrollable panel areas on a DWS.
Figure 7B:
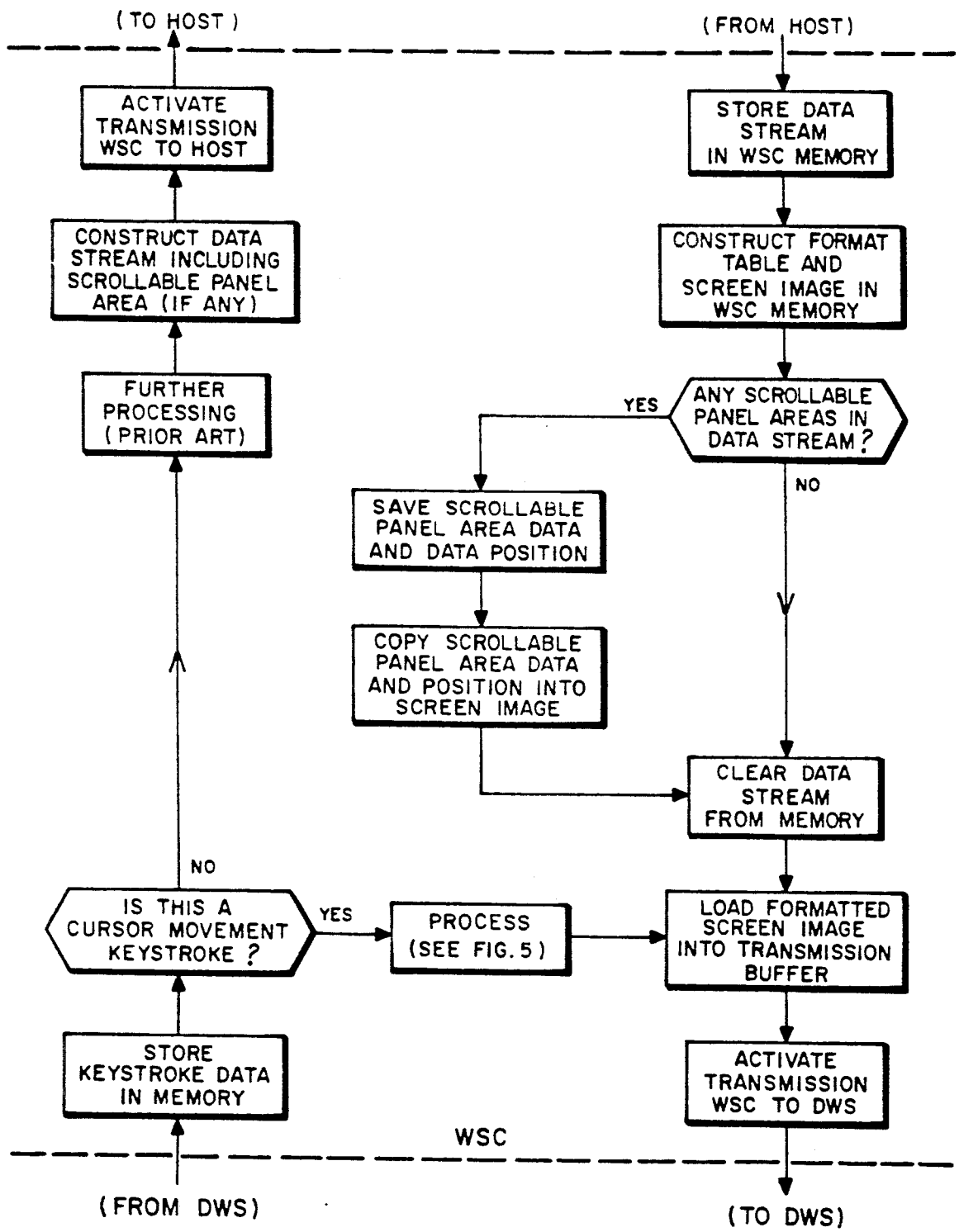

When a DWS keystroke requiring host processing is depressed, the displayed position of the data within the scrollable panel area is transmitted to the host processor by the WSC (see FIG. 7B). The reason for this transmission is that the host processor may need to reconstruct the exact same panel display at some later time. However, the local storage of panel display data within the WSC allows a user to scroll through a large list of items faster than could otherwise be possible if the user were required to scroll through the same list using the host processor as a storage resource for the scrollable data.

FIGS. 7A and 7B show a flow chart for the overall process, and with reference to the flow chart of FIG. 5. The host computer processor initially executes application programs, and as a consequence of executing such application programs, determines the particular display panels which are to form the screen images at the DWS devices connected in the system. The host processor constructs a data stream to create each display panel, according to techniques which are well known in the art. If scrollable panel areas are to be included in the display screen image, the scrollable data is added to the data stream, and the location and size of the scrollable area is defined within the data stream, and the initial scrollable data to be displayed is defined within the data stream. The data stream is stored in a transmission buffer and the host processor activates a transmission of this data stream to the WSC. The WSC receives the data stream and constructs a format table and screen image for the particular DWS to which the screen image is directed. If scrollable panel areas are included in the data stream the WSC saves the scrollable panel area data in a separate area of memory and copies the displayed portion of the scrollable panel area data into a screen image construct. The data stream received from the host processor is then cleared from memory and a properly formatted screen image is placed into a transmission buffer. The WSC then activates a transmission of this formatted screen image to the designated DWS, according to technique which are well known in the art. The DWS receives the screen image information and stores it to enable it to retain the screen image on the display.

When a DWS operator makes a keystroke, the keystroke data is transmitted to the WSC and placed in a memory area designated for the particular DWS. The WSC determines whether the keystroke data is a cursor movement keystroke, and if it is, it executes the process illustrated in FIG. 5. As a result of this process a new screen image may be created, and the scrollable panel area data associated with the new screen image is saved in the memory area reserved for the designated DWS. The new screen image is transmitted to the DWS by the WSC.

If the keystroke received by the WSC is not a cursor movement keystroke, the WSC processes the keystroke data according to techniques known in the prior art. If required, the WSC constructs a data stream for transmission to the host processor, and activates the transmission to the host processor. The data stream will include current scrollable panel area status, so that the host processor will be able to account for the current scrollable panel area in its construct of a new screen image, if necessary, for retransmission to the DWS via the WSC.

From the foregoing description, it is apparent that the WSC assumes the processing requirements for accomplishing cursor-sensitive scrolling on all of the DWS devices to which it is connected. This additional processing load is readily accomplished within the WSC, although in some systems it may be necessary to provide expanded memory capabilities for the additional storage requirements. Because the processing load for cursor-sensitive scrolling is handled within the WSC, no substantial increase in processing load is presented to the host processor. Although the additional processing load may require some enhancement of the WSC capabilities, the increased costs of this enhancement is incurred only once, and no increase in cost of the DWS devices is required. Therefore, the additional of a cursor-sensitive scrolling feature and capability is provided to all of the DWS devices within a system at a very nominal, if any, cost increase for the entire system.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention. For example, the embodiment described herein could be adapted to provide horizontal scrolling in appropriate situations.

What is claimed is:

1. A method of expanding and enhancing cursor control and scrollable panel display in a plurality of dependent workstations connected to a workstation controller, comprising the steps of:
    a) prestoring, in said workstation controller, format tables to describe display screen scrollable panel areas, selection fields and entry fields, list entries and informational text, and scrollable panel data, all relating to cursor position, for each of said plurality of dependent workstations;
    b) asynchronously receiving cursor keystroke signals in said workstation controller from any of said plurality of dependent workstations;
    c) identifying, within said workstation controller, as to each of said asynchronously received cursor keystroke signals, the particular dependent workstation from which such signal is received, and retrieving the scrollable panel data for said particular dependent workstation;
    d) developing, within said workstation controller, a new cursor target position and display screen image corresponding to the received cursor keystroke signal from the particular dependent workstation and the retrieved scrollable panel data; and
    e) transmitting a new display screen image to the particular dependent workstation to modify the cursor target position and display screen image in said particular workstation to correspond to the workstation controller-developed new cursor target position and display screen image.

2. The method of claim 1, wherein the step of developing a display screen image further comprises the steps of examining said scrollable panel data to determine whether scrolling of said display screen image is required.

3. The method of claim 2, wherein the step of developing a display screen image further comprises saving the scrollable panel data.

4. A method of controlling cursor-sensitive scrolling on a plurality of dependent workstation display screens respectively located in a plurality of dependent workstations, from a single workstation controller, comprising the steps of:
   a) prestoring, in said workstation controller, format tables and scrollable panel area definitions as to each of the plurality of dependent workstations;
   b) independently receiving cursor keystroke signals from each of said plurality of dependent workstations into said controller;
   c) comparing each received cursor keystroke signal in said workstation controller with the format table and scrollable panel area definitions for the dependent workstation corresponding to the independently-received cursor keystroke signal; and
   d) forming a new display screen image in said workstation controller and transmitting said new display screen image to the dependent workstation corresponding to the independently-received cursor keystroke signal, for each independently-received cursor movement keystroke signal, to initiate a scrolled display panel area on the dependent workstation corresponding to the independently-received cursor keystroke signal.

5. The method of claim 4, wherein the step of forming a new display screen image further comprises updating and displaying scrolling indicators which form a part of said new display screen image.

* * * * *